(12) United States Patent
Oogami et al.

(10) Patent No.: US 7,555,695 B2
(45) Date of Patent: Jun. 30, 2009

(54) DATA TRANSMITTING APPARATUS, DATA RECEIVING APPARATUS, DATA TRANSMITTING METHOD, AND DATA RECEIVING METHOD

(75) Inventors: Syougo Oogami, Kawasaki (JP); Hiroshi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 504 days.

(21) Appl. No.: 10/971,099

(22) Filed: Oct. 25, 2004

(65) Prior Publication Data
US 2005/0278602 A1 Dec. 15, 2005

(30) Foreign Application Priority Data
Jun. 9, 2004 (JP) .............................. 2004-171681

(51) Int. Cl.
*H03M 13/00* (2006.01)
(52) U.S. Cl. ...................................... 714/758; 714/776
(58) Field of Classification Search ................. 714/757, 714/772, 775, 789, 798, 758, 776
See application file for complete search history.

(56) References Cited

U.S. PATENT DOCUMENTS

| | | | | |
|---|---|---|---|---|
| 5,241,546 | A * | 8/1993 | Peterson et al. ............. | 714/761 |
| 5,448,592 | A * | 9/1995 | Williams et al. ............ | 375/261 |
| 5,856,988 | A | 1/1999 | Kiriyama | |
| 5,875,439 | A * | 2/1999 | Engel et al. ................... | 706/41 |
| 5,881,071 | A * | 3/1999 | Kuznetsov et al. .......... | 714/752 |
| 5,896,374 | A | 4/1999 | Okumura et al. | |
| 5,903,560 | A * | 5/1999 | Samejima et al. ........... | 370/378 |
| 6,226,769 | B1 * | 5/2001 | Schuster et al. ............. | 714/752 |
| 6,266,710 | B1 * | 7/2001 | Dittmer et al. ................. | 710/1 |
| 6,377,643 | B1 * | 4/2002 | Lee et al. ..................... | 375/368 |
| 6,598,203 | B1 * | 7/2003 | Tang .......................... | 714/790 |
| 6,772,385 | B2 * | 8/2004 | Ohyama et al. ............. | 714/755 |
| 6,957,378 | B2 * | 10/2005 | Koga et al. .................. | 714/763 |
| 7,246,303 | B2 * | 7/2007 | Bansal et al. ............... | 714/800 |
| 2001/0053225 | A1 * | 12/2001 | Ohira et al. ................. | 380/239 |
| 2002/0048335 | A1 * | 4/2002 | Saeki .......................... | 375/371 |
| 2002/0129313 | A1 * | 9/2002 | Kubo et al. ................. | 714/752 |

(Continued)

FOREIGN PATENT DOCUMENTS

JP 62-7238 A 1/1987

(Continued)

OTHER PUBLICATIONS

Mitani, "Yarinaoshi no tame no kougyou sugaku", CQ Publishing Co., Ltd., Jan. 1, 2001, p. 48.

(Continued)

*Primary Examiner*—M. Mujtaba K Chaudry
(74) *Attorney, Agent, or Firm*—Staas & Halsey LLP

(57) ABSTRACT

A data transmitting apparatus that transmits a plurality of bits in parallel in synchronization with clocks includes a code generating unit that divides transmission data into a plurality of partial data, and generates an error correction code for each of the partial data; a data dividing unit that divides the transmission data into a plurality of 1-clock data formed of a plurality of bits transmitted in parallel; and a transmission control unit that sequentially transmits each of the 1-clock data in synchronization with a clock cycle, and collectively transmits the error correction codes generated by the code generating unit in a 1-clock cycle.

19 Claims, 13 Drawing Sheets

U.S. PATENT DOCUMENTS

2002/0184592 A1* 12/2002 Koga et al. .................. 714/763
2003/0123389 A1* 7/2003 Russell et al. ............... 370/230

FOREIGN PATENT DOCUMENTS

| | | |
|---|---|---|
| JP | 63-30036 A | 2/1988 |
| JP | 6-125331 A | 5/1994 |
| JP | 08-265332 | 10/1996 |
| JP | 8-279799 | 10/1996 |
| JP | 9-83603 A | 5/1997 |
| JP | 11-215075 A | 8/1999 |
| JP | 11-275086 | 10/1999 |
| JP | 11-341102 | 12/1999 |
| JP | 2000-20409 | 1/2000 |
| JP | 2001-285260 | 10/2001 |
| JP | 2003-198511 A | 7/2003 |
| WO | WO96/26582 | 8/1996 |

OTHER PUBLICATIONS

Inoue, "How to Identify Bit Error?", Nikkei Network, vol. 3, 2001, Nikkei Business Publications, Inc., Feb. 22, 2001.

Japanese Patent Office Action, mailed Jul. 1, 2008 and issued in corresponding Japanese Patent Application No. 2004-171681.

* cited by examiner

ECC CODES ARE NOT ADDED TO SECOND AND SUBSEQUENT DATA

ECC CODES ARE ADDED TO SECOND AND SUBSEQUENT DATA

DATA TRANSMITTING APPARATUS, DATA RECEIVING APPARATUS, DATA TRANSMITTING METHOD, AND DATA RECEIVING METHOD

BACKGROUND OF THE INVENTION

1) Field of the Invention

The present invention relates to a technology for transmitting and receiving a plurality of bits in parallel in synchronization with clocks, which improves an error correction capability in data transmission without increasing the number of signal lines and without causing a transmission delay for a reliable data transmission.

2) Description of the Related Art

When N-bit data is transmitted by using a bus between large-scale-integrated (LSI) devices, such as a central processing unit (CPU) and a crossover LSI or between modules in an LSI device, the data is divided into N/m bits at m clocks. For example, when 128-bit data is transmitted by using a 32-bit bus, the 128-bit data are divided into 32 bits, and the 32-bit data are transmitted at four clocks.

In the conventional data transmission between the LSI devices or between the modules, a parity bit is used to cope with a transmission error. FIG. 15 is a schematic for explaining a conventional error correction method in inter-module data transmission.

In the example shown in FIG. 15, 128-bit data is divided into 32 bits and transmitted at four clocks. One parity bit is added to one 32-bit clock data in a bit direction to transmit 33-bit data. A parity bit is added to each bit position of the 32 bits in a clock direction. The data is transmitted in the next additional cycle of the 4-clock data cycle.

In the vertical/horizontal parity coding scheme, one bit error in N-bits can be corrected, and a 2-bit error can be detected. For example, in the example shown in FIG. 15, when an error "X" occurs at a bit position "32" of data transmitted at the first clock, the error can be corrected by using the parity bit added to the data and the parity bit added to the bit position "32" in a clock direction (see, for example, Japanese Patent Laying-Open No. 6-125331 and Mitani Masaaki, "Yarinaoshi no tame no kougyou sugaku", p. 48, CQ Publishing Co., Ltd., Jan. 1, 2001).

However, in the conventional vertical/horizontal parity coding scheme, it impossible to correct an error having equal to or more than two bits. In addition, when an even number of errors occur at data at the same clock or the same bit position, it is impossible to detect the error.

SUMMARY OF THE INVENTION

It is an object of the present invention to solve at least the above problems in the conventional technology.

A data transmitting apparatus according to one aspect of the present invention includes a code generating unit that divides transmission data into a plurality of partial data, and generates an error correction code for each of the partial data; a data dividing unit that divides the transmission data into a plurality of 1-clock data formed of a plurality of bits transmitted in parallel; and a transmission control unit that sequentially transmits each of the 1-clock data in synchronization with a clock cycle, and collectively transmits the error correction codes generated by the code generating unit in a 1-clock cycle.

A data transmitting apparatus according to another aspect of the present invention includes a code generating unit that divides transmission data into a plurality of partial data, and generates an error correction code for each of the partial data; a data dividing unit that divides the transmission data into a plurality of 1-clock data formed of a plurality of bits transmitted in parallel; and a transmission control unit that sequentially transmits each of the 1-clock data in synchronization with a clock cycle, and collectively transmits the error correction codes generated by the code generating unit using a blank of a control signal.

A data receiving apparatus according to still another aspect of the present invention includes a reception control unit that receives transmission data transmitted by a data transmitting apparatus using a plurality of clock cycles as a plurality of 1-clock data, and collectively receives a plurality of error correction codes generated from a plurality of partial data generated by dividing the transmission data in a 1-clock cycle; a data building unit that builds entire data from the 1-clock data received by the reception control unit; and an error correcting unit that corrects the entire data built by the data building unit using the error correction codes received by the reception control unit to obtain reception data.

A data receiving apparatus according to still another aspect of the present invention includes a reception control unit that receives transmission data transmitted by a data transmitting apparatus using a plurality of clock cycles as a plurality of 1-clock data, and collectively receives a plurality of error correction codes generated from a plurality of partial data generated by dividing the transmission data using a blank of a control signal; a data building unit that builds entire data from the 1-clock data received by the reception control unit; and an error correcting unit that corrects the entire data built by the data building unit using the error correction codes received by the reception control unit to obtain reception data.

A data transmitting method according to still another aspect of the present invention includes dividing transmission data into a plurality of partial data; generating an error correction code for each of the partial data; dividing the transmission data into a plurality of 1-clock data formed of a plurality of bits transmitted in parallel; transmitting each of the 1-clock data in synchronization with a clock cycle in sequence; and transmitting the error correction codes generated by the code generating unit in a 1-clock cycle collectively.

A data transmitting method according to still another aspect of the present invention includes receiving transmission data transmitted by the data transmitting apparatus using a plurality of clock cycles as a plurality of 1-clock data; receiving a plurality of error correction codes generated from a plurality of partial data generated by dividing the transmission data in a 1-clock cycle collectively; building entire data from the 1-clock data received by the reception control unit; and correcting the entire data using the error correction codes received to obtain reception data.

The other objects, features, and advantages of the present invention are specifically set forth in or will become apparent from the following detailed description of the invention when read in conjunction with the accompanying drawings.

DETAILED DESCRIPTION

Exemplary embodiments of a data transmitting apparatus, a data receiving apparatus, a data transmitting method, and a data receiving method according to the present invention are described in detail with reference to the accompanying drawings. A case in which the present invention is applied to data transmission between modules is mainly explained.

Figure 1:
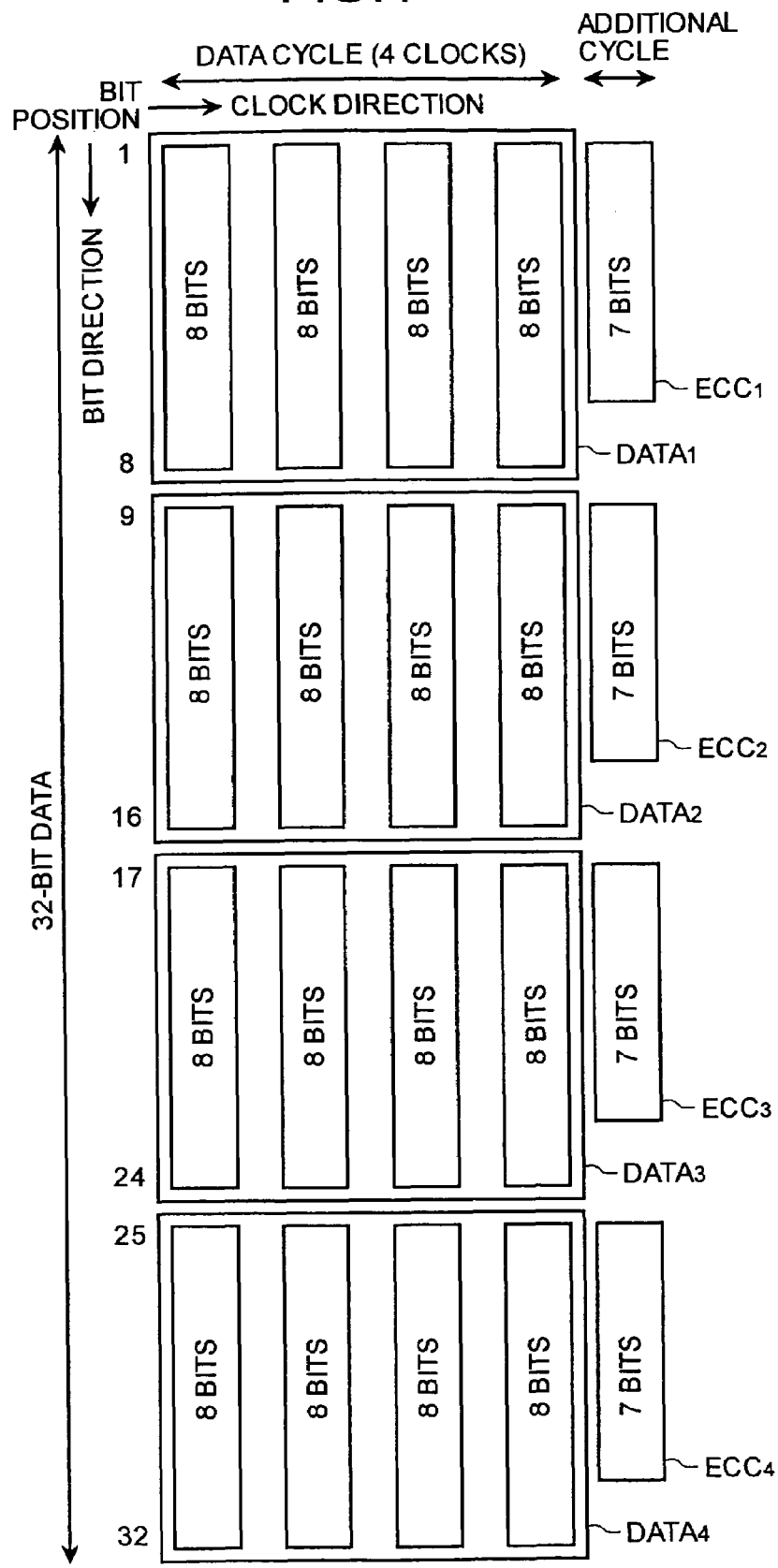
FIG. 1 is a schematic for explaining an error correction method according to an embodiment of the present invention.

FIG. 1 is a schematic for explaining an error correction method according to an embodiment of the present invention. An ECC1 that corrects a 1-bit error is generated for 32-bit partial data, which is transmitted at bit positions 1 to 8, of a bus of 128-bit transmission data transmitted at 4 clocks, i.e., data1. An ECC2 that corrects a 1-bit error is generated to 32-bit partial data transmitted at bit positions 9 to 16 of the bus, i.e., data$_2$.

In this case, the bit length of an error correction code (ECC) that corrects a 1-bit error with respect to an N-bit data is given by log2N+2. Therefore, the bit length of the ECC that corrects a 1-bit error for 32-bit data is given by $\log_2 32 + 2 = 7$. ECC bits may be made redundant to be 8 bits.

Similarly, an ECC$_3$ that corrects a 1-bit error is generated for 32-bit partial data transmitted at bit positions 17 to 24 of the bus, i.e., data$_3$. An ECC$_4$ that corrects a 1-bit error is generated for 32-bit partial data transmitted at bit positions 25 to 32 of the bus, i.e., data$_4$. The ECC$_1$ to ECC$_4$ are simultaneously transmitted in the next cycle subsequent to the 4-clock data cycle.

In this manner, in the error correction scheme according to the embodiment, ECC1 to ECC4 are generated for the data1 to data4 obtained by dividing the transmission data based on the bit positions of the bus to transmit the data, so that 1-bit error correction can be performed in each of the datai (i=1, 4). Therefore, a 4-bit error can be corrected in the entire 128-bit data, and error correction capability that is higher than that of 1-bit error correction in the vertical/horizontal parity coding scheme can be achieved.

In the error correction scheme according to the embodiment, a parity bit in a bit direction need not be added to 32-bit 1-clock data transmitted in clock cycles. Therefore, an error correction can be performed without increasing a bus width.

Figure 2:
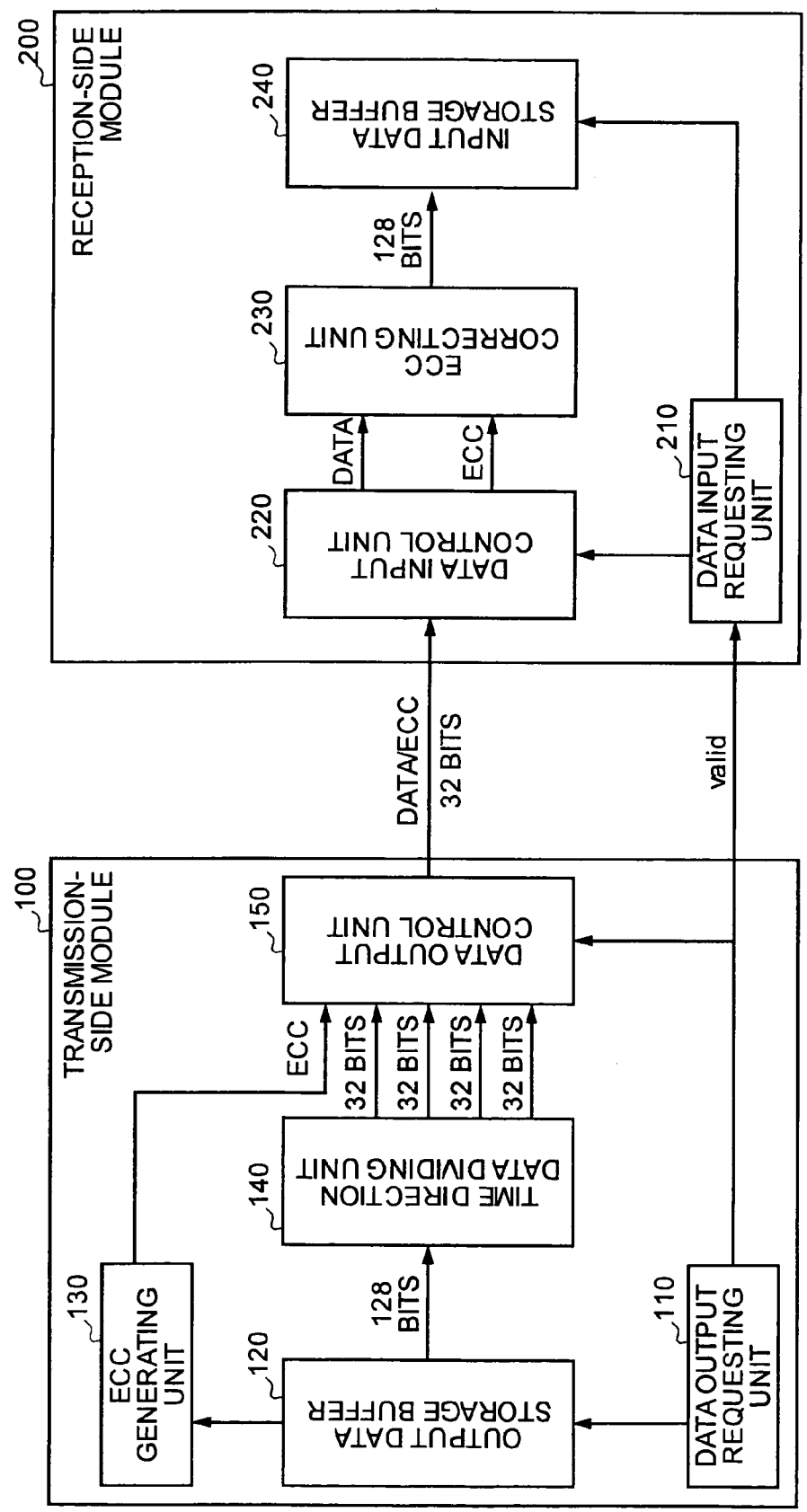
FIG. 2 is a block diagram of a transmission-side module and a reception-side module according to the embodiment.

FIG. 2 is a block diagram of a transmission-side module and a reception-side module according to the embodiment. As shown in FIG. 2, a transmission-side module 100 according to the embodiment includes a data output request unit 110, an output data storage buffer 120, an ECC generating unit 130, a time-direction-data dividing unit 140, and a data-output control unit 150. A reception-side module 200 includes a data input request unit 210, a data input control unit 220, an ECC correcting unit 230, and an input data storage buffer 240.

The data output request unit 110 is a processing unit that requests the reception-side module 200 to transmit 128-bit data. The data output request unit 110 stores transmission data in the output data storage buffer 120 and transmits a valid signal to be synchronized with the reception-side module 200.

Figure 3:
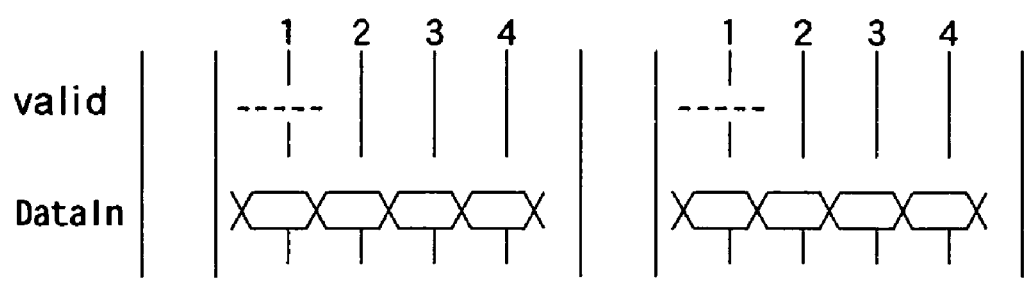
FIG. 3 is a time chart of data transmission.

FIG. 3 is a time chart of data transmission. As shown in FIG. 3, the valid signal representing the start of data transmitted in a plurality of clock cycles. Therefore, one data is transmitted in a period from valid=ON to the fourth clock.

The output data storage buffer 120 is a buffer that stores 128-bit data transmitted from the transmission-side module 100 to the reception-side module 200 based on a request from the data output request unit 110.

The ECC generating unit 130 is a processing unit that reads the transmission data from the output data storage buffer 120 to generate an ECC. More specifically, the ECC generating unit 130, as shown in FIG. 1, divides the 128-bit transmission data into four data$_1$ to data$_4$ based on the bit positions of a 32-bit bus, and generates ECC$_1$ to ECC$_4$ for the data$_1$ to data$_4$.

When the ECC generating unit 130 generates the ECC$_1$ to ECC$_4$ for the data$_1$ to data$_4$, respectively, a 1-bit error can be corrected in each of the data$_1$ to data$_4$.

The time-direction-data dividing unit 140 is a processing unit that reads the transmission data from the output data storage buffer 120 and divides the read transmission data into four 32-bit data transmitted in the 4-clock data cycle shown in FIG. 1.

The data-output control unit 150 is a processing unit that transmits the four 32-bit data generated by the time-direction-data dividing unit 140 in continuous 4-clock data cycles and simultaneously transmits the ECC$_1$ to ECC$_4$ generated by the ECC generating unit 130 in the next cycle. The data-output control unit 150 receives the valid signal from the data output request unit 110 to transmit the front 32-bit data in synchronization with the valid signal.

The data input request unit 210 is a processing unit that receives a valid signal from the transmission-side module 100 and requests the data input control unit 220 to receive data in synchronization with valid signals.

The data input control unit 220 is a processing unit that receives the divided data and the ECCs transmitted from the transmission-side module 100 based on the request from the data input request unit 210 and assembles 128-bit data obtained before the division.

The ECC correcting unit 230 is a processing unit that receives the 128-bit data and the ECCs from the data input control unit 220 to perform error correction. More specifically, the ECC correcting unit 230 performs error correction for the data1 to data4 by using the ECC1 to ECC4, respectively.

When the ECC correcting unit 230 performs error correction by using the ECC$_1$ to ECC$_4$ for the data$_1$ to data$_4$, respectively, 1-bit errors occurring in the data$_1$ to data$_4$ during data transmission can be corrected.

The input data storage buffer 240 is a buffer that stores 128-bit data subjected to error correction by the ECC correcting unit 230. When the 128-bit data is stored in the input data storage buffer 240, data receiving is completed.

Figure 4:
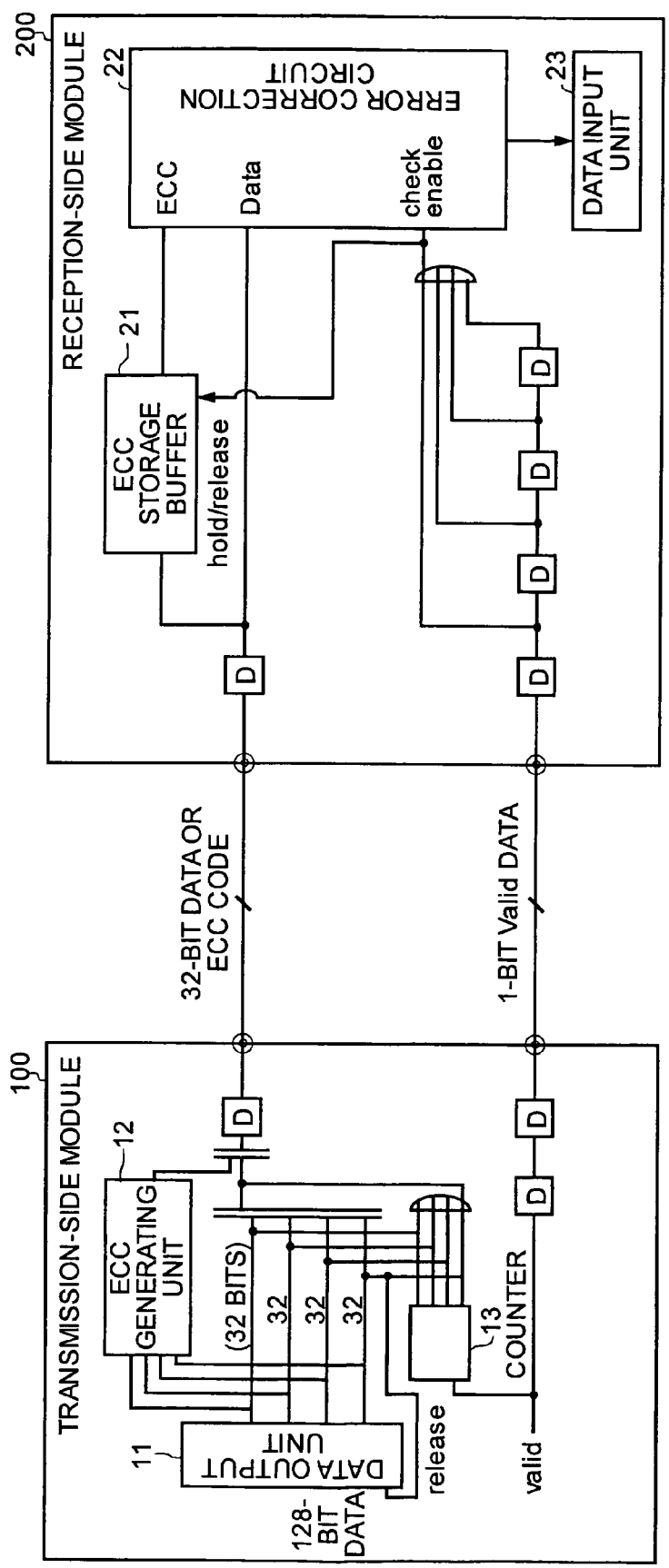
FIG. 4 is a circuit diagram of an example of implementing the transmission-side module and the reception-side module shown in FIG. 2.

FIG. 4 is a circuit diagram of an example of implementing the transmission-side module 100 and the reception-side module 200 shown in FIG. 2. The transmission-side module 100 includes a data output unit 11, an ECC generating unit 12, and a counter 13. The reception-side module 200 includes an ECC storage buffer 21, an error correction circuit 22, and a data input unit 23. As shown in FIG. 4, reference symbol "D" denotes delay of one clock.

The data output unit 11 outputs 128-bit data by using four 32-bit signal lines. The ECC generating unit 12 generates $ECC_1$ to $ECC_4$ for the $data_1$ to $data_4$ shown in FIG. 1 by using four 32-bit data output by the data output unit 11.

More specifically, the ECC generating unit 12 does not generate ECCs for the four 32-bit data received by using the 32-bit signal line, and generates the $ECC_1$ to $ECC_4$ for the $data_1$ to $data_4$ based on bit positions of the 32-bit bus.

The counter 13 receives a valid signal to count clocks. On the basis of the number of clocks counted by the counter 13, an ECC generated by the ECC generating unit 12 or one of the four 32-bit data output by the data output unit 11 is selected to be transmitted to the reception-side module 200.

The 32-bit data and the ECC transmitted by the transmission-side module 100 are temporarily stored in the ECC storage buffer 21 by the reception-side module 200 and given to the error correction circuit 22. The error correction circuit 22 performs error correction to the received data to store the data in the data input unit 23.

Figure 5:
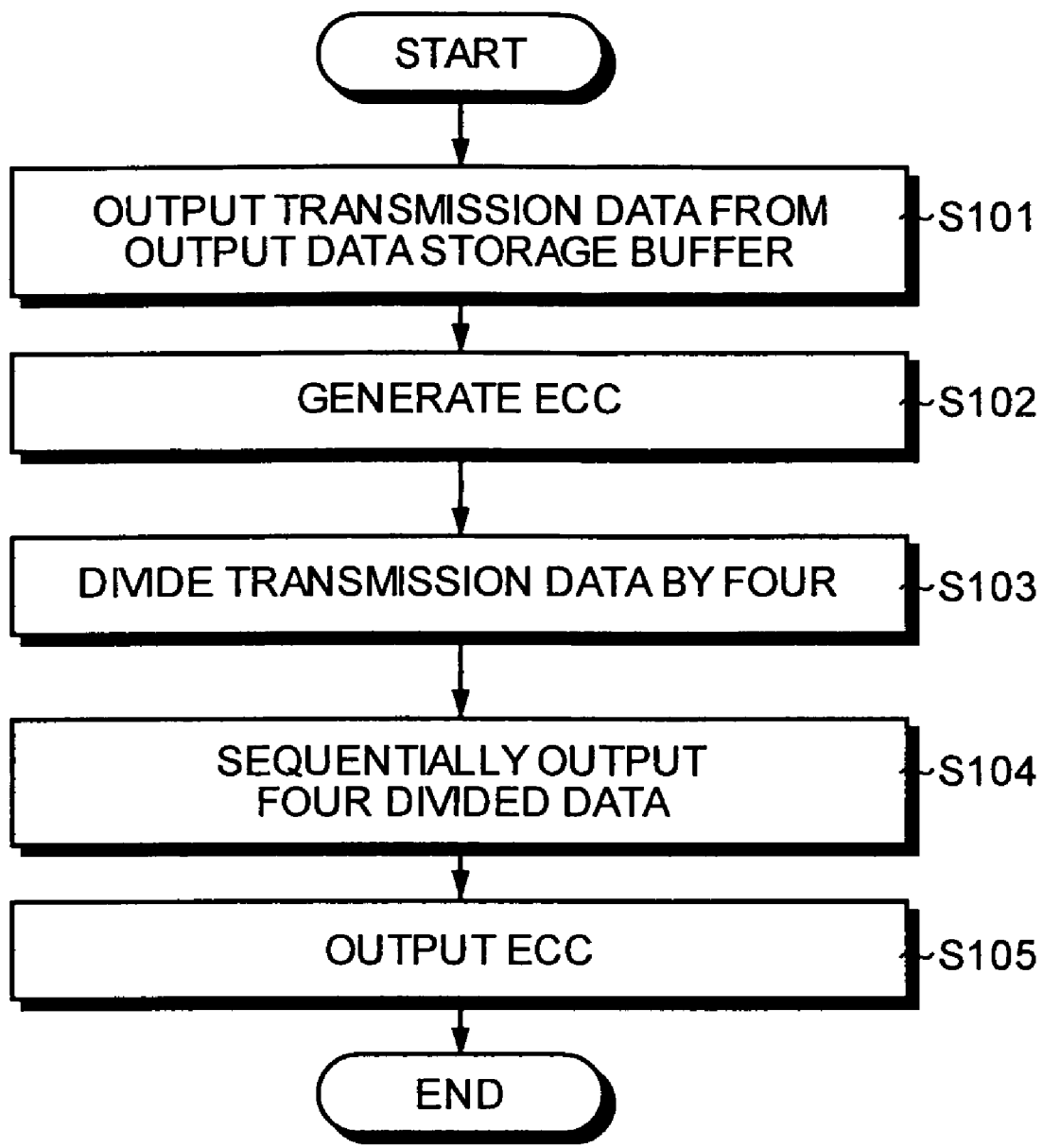
FIG. 5 is a flowchart of a process procedure for transmitting data by the transmission-side module shown in FIG. 2.

FIG. 5 is a flowchart of a process procedure for transmitting data by the transmission-side module 100 shown in FIG. 2. In the transmission-side module 100, the data output request unit 110 requests the output data storage buffer 120 to output transmission data (step S101). The ECC generating unit 130 reads the transmission data from the output data storage buffer 120 to generate ECC1 to ECC4 for the data1 to data4 shown in FIG. 1 (step S102).

The time-direction-data dividing unit 140 reads from the transmission data from the output data storage buffer 120 and divides the transmission data into four 32-bit data to be transmitted in a 4-clock data cycle (step S103).

The data-output control unit 150 sequentially outputs the four 32-bit data generated by the time-direction-data dividing unit 140 at four clocks synchronized with the valid signals from the data output request unit 110 (step S104), and the $ECC_1$ to $ECC_4$ are simultaneously output at the next clock (step S105).

In this manner, the data-output control unit 150 outputs the $ECC_1$ to $ECC_4$ at the clock next to the clocks at which the four 32-bit data are sequentially output, so that the reception-side module 200 receives the $ECC_1$ to $ECC_4$ to make it possible to correct an error occurring during data transmission.

Figure 6:
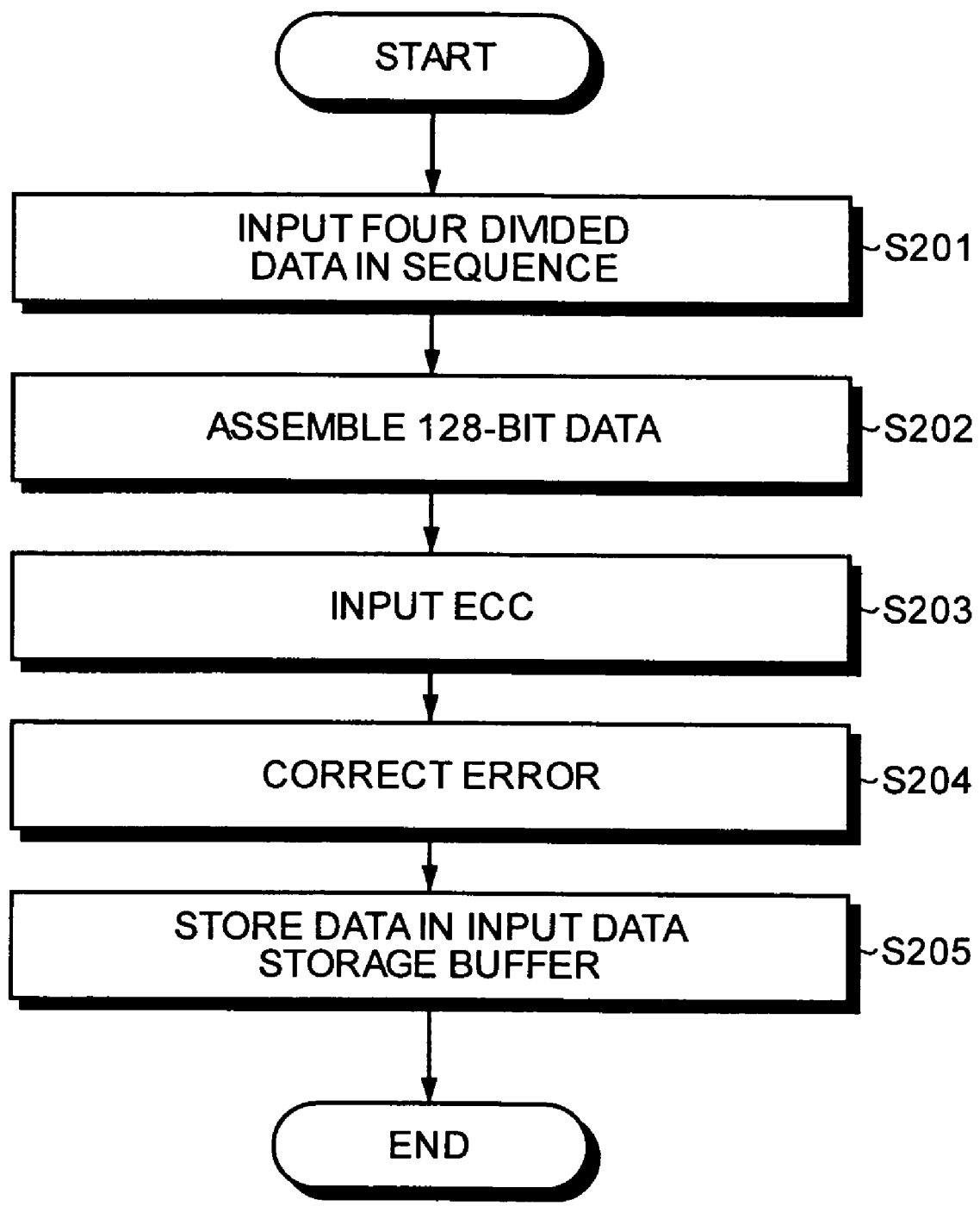
FIG. 6 is a flowchart of a process procedure for receiving data by the reception-side module shown in FIG. 2.

FIG. 6 is a flowchart of a process procedure for receiving data by the reception-side module 200 shown in FIG. 2. In the reception-side module 200, based on a request from the data input request unit 210, the data input control unit 220 sequentially inputs the four divided data in synchronization with the valid signals (step S201) to assemble 128-bit data (step S202).

Subsequent to the four divided data, the $ECC_1$ to $ECC_4$ are input (step S203) and given to the ECC correcting unit 230 together with the assembled 128-bit data. The ECC correcting unit 230 which receives the 128-bit data and the $ECC_1$ to $ECC_4$ perform error correction (step S204) and stores the corrected data in the input data storage buffer 240 (step S205).

In this manner, the ECC correcting unit 230 of the reception-side module 200 performs the error correction by using the $ECC_1$ to $ECC_4$, so that data transmission between the reception-side module 200 and the transmission-side module 100 can be performed with high reliability.

As has been described above, in the present embodiment, in the transmission-side module 100, the ECC generating unit 130 generates the $ECC_1$ to $ECC_4$ for the $data_1$ to $data_4$ obtained by dividing the transmission data, the time-direction-data dividing unit 140 divides the transmission data to generate four 32-bit data, and the data-output control unit 150 sequentially transmits the four 32-bit data in a 4-clock data cycle. In the next cycle, the $ECC_1$ to $ECC_4$ are simultaneously transmitted. In the reception-side module 200, the data input control unit 220 receives the data and the $ECC_1$ to $ECC_4$, and the ECC correcting unit 230 performs error correction for the received data by using the $ECC_1$ to $ECC_4$. Therefore, data transmission between the modules can be performed with high reliability without increasing a bus width.

In the present embodiment, since the ECC1 to ECC4 are simultaneously transmitted in one additional cycle, unlike in the vertical/horizontal parity coding scheme, transmission delay can be prevented without requiring an excessive additional cycle.

The present embodiment describes the case in which the $ECC_1$ to $ECC_4$ are simultaneously transmitted in one additional cycle. However, when a bus width can be increased, data of each clock can be transmitted together with an ECC to make an additional cycle unnecessary.

The present embodiment describes the case in which the four 32-bit data and the ECC1 to ECC4 are transmitted in continuous clock cycles. However, the data and the ECCs need not be transmitted in continuous clock cycles, and the data and the ECCs can also be transmitted clock cycles including an idle clock cycle set therebetween.

The present embodiment describes a single data rate (SDR) in which one data is transmitted in a 1-clock cycle. However, the present invention can also be applied to a double data rate (DDR) in which two data are transmitted in a 1-clock cycle and a quad data rate (QDR) in which four data are transmitted in a 1-clock cycle.

The present embodiment describes the scheme in which transmission data is divided by four based on bit positions used when the transmission data is transmitted on the bus to generate ECC1 to ECC4. However, the transmission data can be differently divided to make it possible to generate ECCs. Therefore, a scheme in which the transmission data is differently divided to generate ECCs will be described below.

Figure 7:
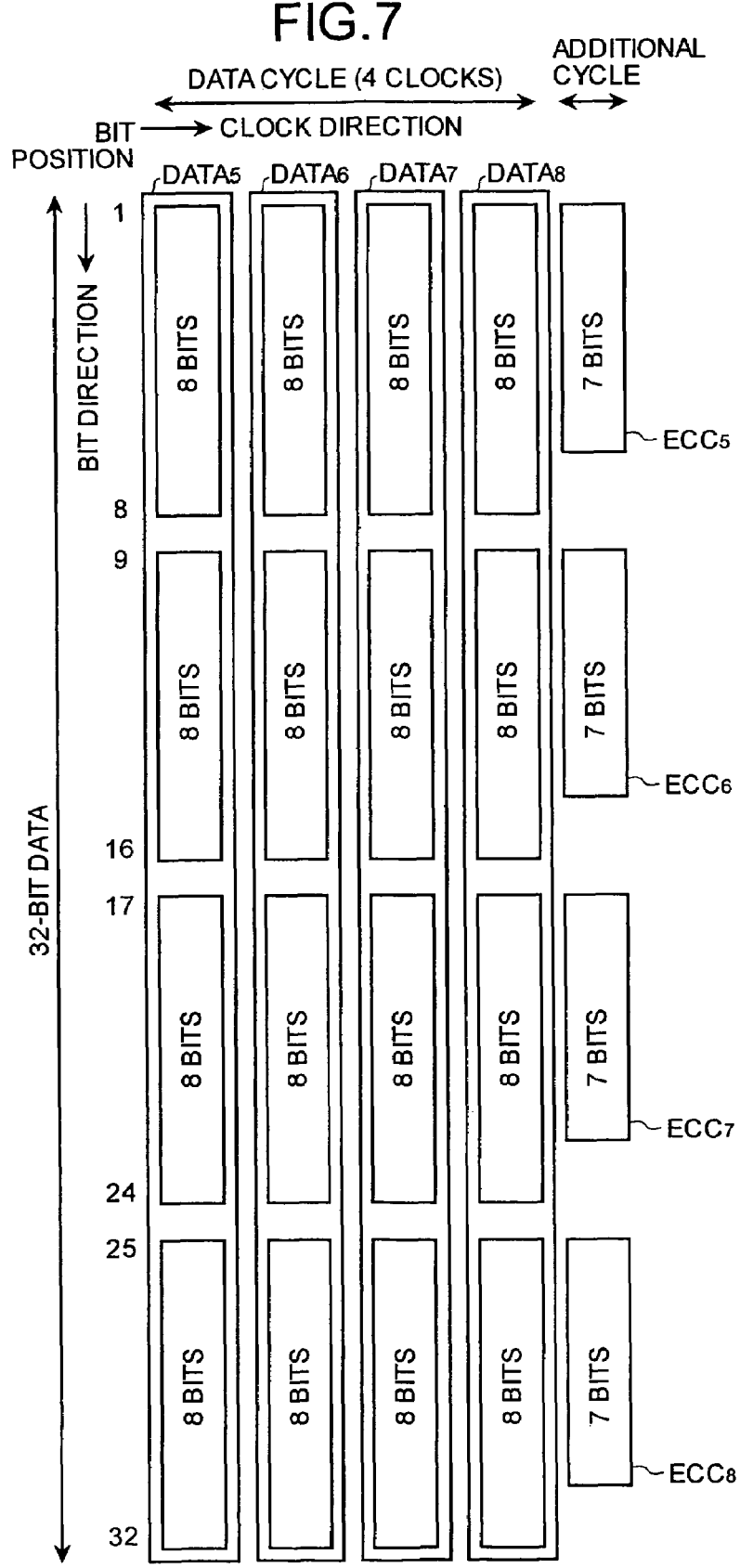
FIG. 7 is a schematic for explaining a method of generating an ECC for respective data transmitted at each clock.

FIG. 7 is a schematic for explaining a method of generating an ECC for respective data transmitted at each clock. In this scheme, ECC5 to ECC8 are generated for data5 to data8 serving as 32-bit data transmitted at the clocks, and the data-output control unit 150 simultaneously transmits the ECC5 to ECC8 in the cycle next to the cycle in which the data5 to data8 are transmitted.

More specifically, in the transmission-side module 100 shown in FIG. 2, the ECC generating unit 130 generates the $ECC_5$ to $ECC_8$ for the $data_5$ to $data_8$, respectively, and the data-output control unit 150 simultaneously transmits the $ECC_5$ to $ECC_8$ in the cycle next to the cycle in which the $data_5$ to $data_8$ are transmitted.

In the reception-side module 200, the data input control unit 220 simultaneously receives the $ECC_5$ to $ECC_8$ subsequently to the $data_5$ to $data_8$. The ECC correcting unit 230 performs error correction to the received data by using the $ECC_5$ to $ECC_8$.

In this manner, in the scheme shown in FIG. 7, the $ECC_5$ to $ECC_8$ are generated for the $data_5$ to $data_8$, respectively, to transmit the $data_5$ to $data_8$, so that error correction for bits the number of which is equal the number of clocks at which divided data are transmitted.

Figure 8:
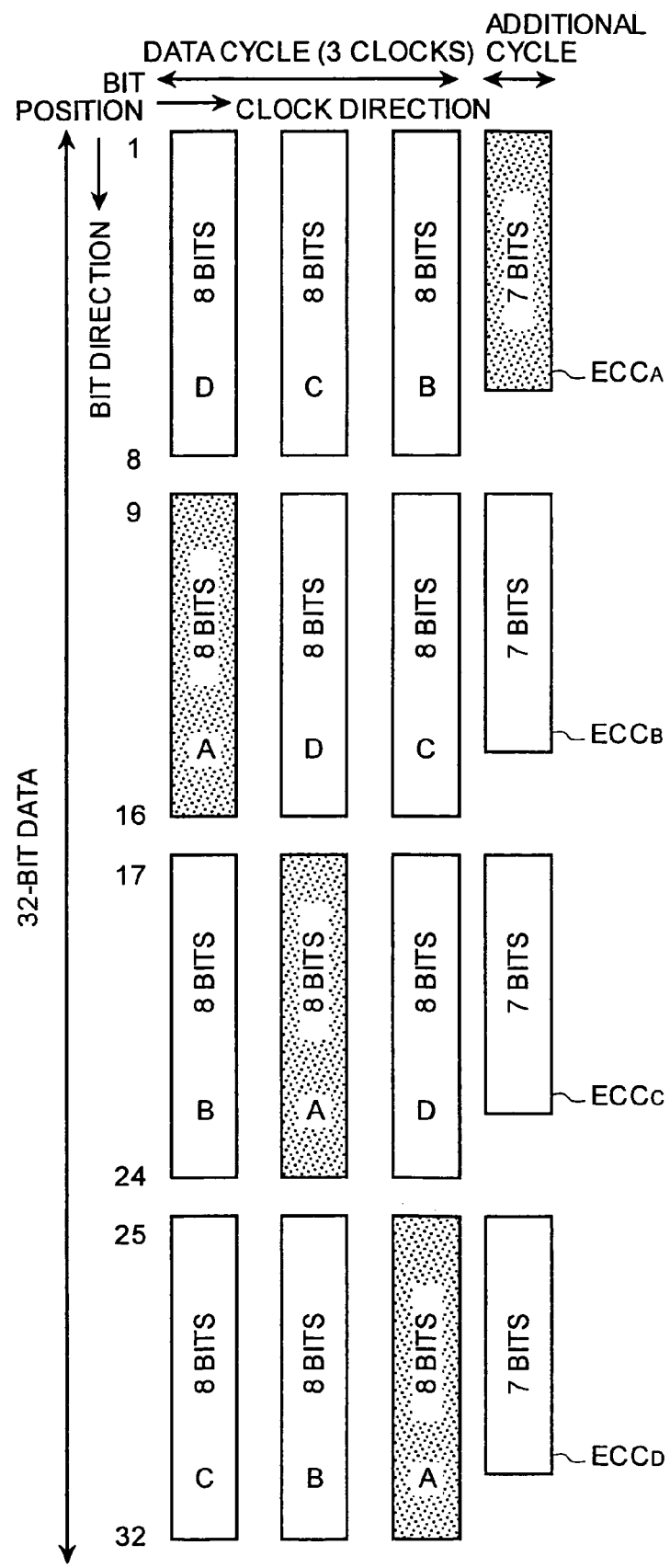
FIG. 8 is a schematic for explaining a method of correcting an error always occurring at a specific bit of a bus.

FIG. 8 is a schematic for explaining a method of correcting an error always occurring at a specific bit of a bus. FIG. 8 depicts a case in which 96-bit data is divided into 32-bit data to transmit the data at three clocks. In this scheme, a 32-bit 1-clock data transmitted at each clock is divided into four 8-bit 1-clock partial data, and one 8-bit 1-clock partial data is selected from each 1-clock data not to overlap bit positions to form groups A to D. ECCA to ECCD are generated for the data in the groups A to D, respectively.

More specifically, in the transmission-side module 100 shown in FIG. 2, the ECC generating unit 130 generates the $ECC_A$ to $ECC_D$ for the data in the groups A to D, respectively, and the data-output control unit 150 simultaneously transmits the $ECC_A$ to $ECC_D$ in the cycle next to the data cycle.

In the reception-side module 200, the data input control unit 220 simultaneously receives the $ECC_A$ to $ECC_D$ subsequently to the data cycle, and the ECC correcting unit 230 performs error correction to the received data by using the $ECC_A$ to $ECC_D$.

In the scheme shown in FIG. 8, bits at specific positions of the bus are assigned to different groups throughout all the cycles including the cycle in which ECCs are transmitted. For example, in FIG. 8, a bit at a bit position "1" on the bus belongs to the group D in the first cycle, belongs to the group C in the second cycle, belongs to the group B in the third cycle, and belongs to the group A in the fourth cycle.

Therefore, when a bit at a specific position on the bus is always an error bit, if the error bit is one bit, the error can be corrected. When 1-bit errors occur in the four groups in one cycle, all the errors can be corrected.

FIG. 8 depicts the case in which the transmission data is divided into ECC groups constituted by the groups A to D. However, when the transmission data is divided into a larger number of ECC groups, the number of bits of bit errors at specific positions on the bus can be increased.

Figure 9:
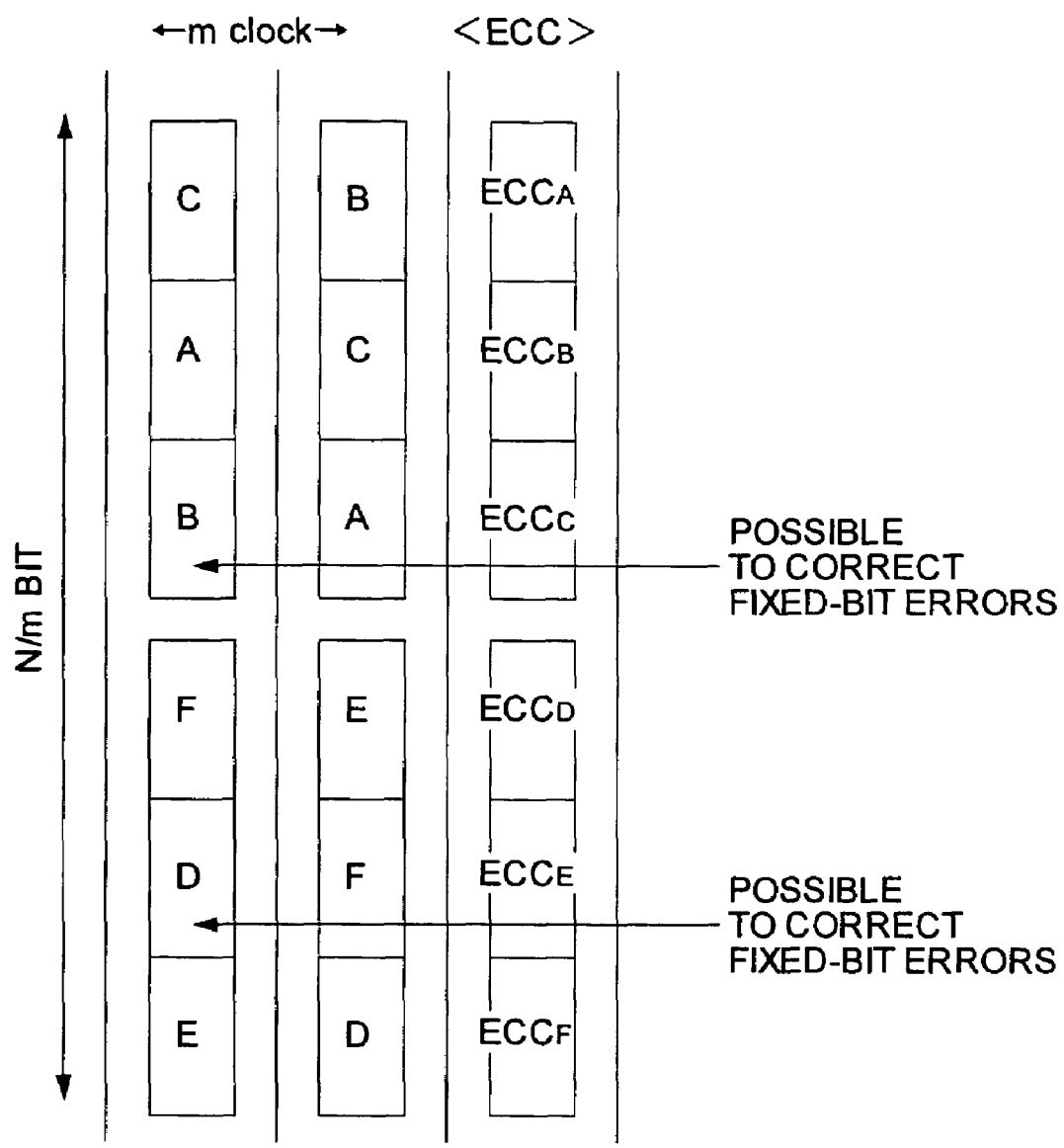
FIG. 9 is a schematic for explaining a method of dividing transmission data into a plurality of ECC groups.

FIG. 9 is a schematic for explaining a method of dividing transmission data into a plurality of ECC groups. In this scheme, transmission data is divided into two ECC groups constituted by three groups A to C and three groups D to F. In this scheme, in transmission in which data length is larger in a bit direction than in a clock direction, even though a plurality of signal lines is broken, when a signal line belonging to another ECC group is present, an error can be corrected.

The present embodiment describes the case in which ECCs are transmitted in an additional cycle subsequent to a data cycle. The ECCs may also be transmitted in another cycle. Therefore, a scheme in which ECCs are transmitted in another cycle or the like will be described below.

Figure 10:
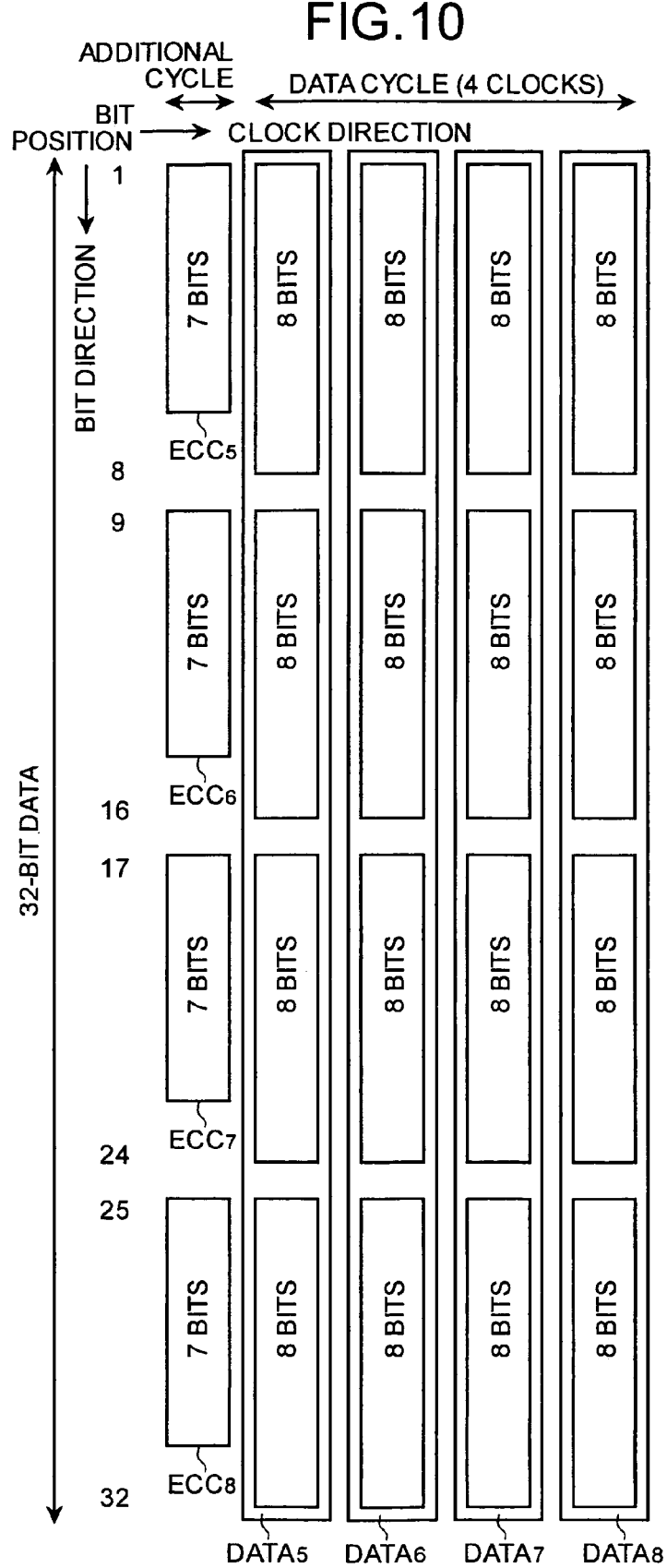
FIG. 10 is a schematic for explaining a method of transmitting the ECC in a cycle before a data cycle.

FIG. 10 is a schematic for explaining a method of transmitting the ECC in a cycle before a data cycle. In this scheme, ECC5 to ECC8 are transmitted in the cycle before the data cycle.

More specifically, in the transmission procedure shown in FIG. 5, ECCs are output at step S105 before data are output at step S104. In the receiving procedure shown in FIG. 6, ECCs are input at step S203 before data are input at step S201.

In the scheme shown in FIG. 10, since the reception-side module 200 receives ECCs ahead of data, the reception-side module 200 needs not wait for reception of the ECCs, and the reception-side module 200 can perform error correction in a receiving order of data. For example, in FIG. 10, the reception-side module 200 can start an error correction process for the $data_5$ at a timing of reception of the $data_6$. Therefore, the error correction process can be performed at a high speed.

Figure 11:
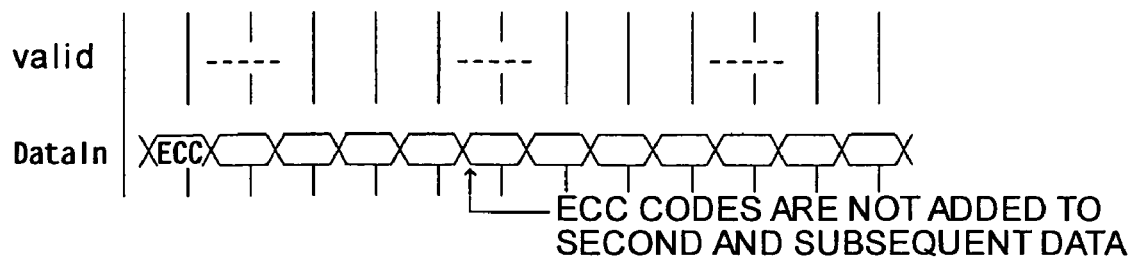
FIG. 11 is a schematic for explaining a method of selecting whether to transmit the ECC.

FIG. 11 is a schematic for explaining a method of selecting whether to transmit the ECC. In this scheme, an ECC is transmitted for the first data in a cycle before a data cycle, and no ECCs are transmitted for the second and subsequent data.

More specifically, in the transmission-side module 100 shown in FIG. 2, the data output request unit 110 designates whether an ECC is transmitted. When the data output request unit 110 designates that an ECC is transmitted, the data-output control unit 150 outputs the ECC.

In the reception-side module 200, the data input request unit 210 designates the presence/absence of an ECC, and the data input control unit 220 inputs the ECC based on the designation performed by the data input request unit 210.

In this manner, when it can be selected whether an ECC is transmitted for each data, it is selected that no ECC is transmitted when a transmission rate is important. When error correction capability is important, it is selected that an ECC is transmitted.

Figure 12:
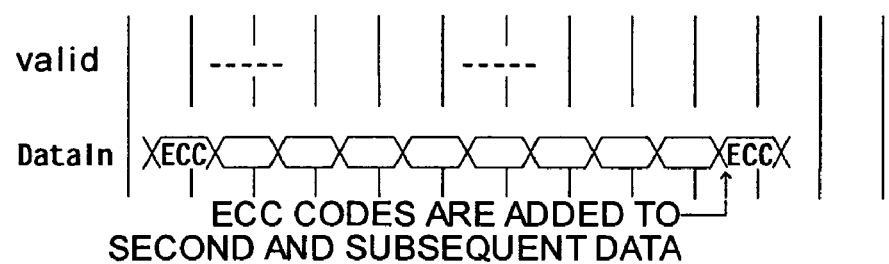
FIG. 12 is a schematic for explaining a method of transmitting the ECC when transmitting two data in a row.

FIG. 12 is a schematic for explaining a method of transmitting the ECC when transmitting two data in a row. In this scheme, an ECC for the first data is transmitted in a cycle before a cycle in which the first data is transmitted, and an ECC for the second data is transmitted in the cycle next to the cycle in which the second data is transmitted.

In this manner, when the two data are continuously transmitted, the ECCs are transmitted before and after the two data to make it possible to transmit the ECCs without adversely affecting transmission of the transmission data.

Figure 13:
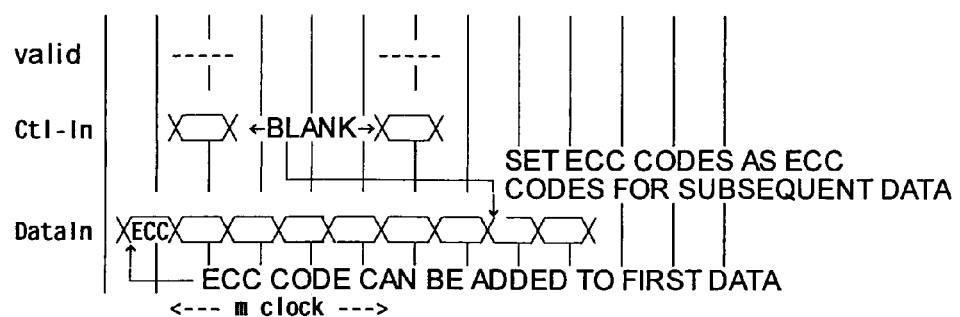
FIG. 13 is a schematic for explaining a method of transmitting the ECC using a control signal.

FIG. 13 is a schematic for explaining a method of transmitting the ECC using a control signal. Under the condition using a control signal (Ctl-In), the ECC can be transmitted by using an idle cycle which does not use the control signal.

More specifically, in the transmission-side module 100 shown in FIG. 2, the data-output control unit 150 finds a blank for a control signal by using a control signal line in place of a data bus to output an ECC. In the reception-side module 200, the data input control unit 220 inputs the ECC by using the control signal line in place of a data bus.

In this manner, when the ECC is transmitted by using the blank for a control signal, the ECC can be transmitted without adversely affecting data transmission, and the reliability of data transmission can be improved.

Figure 14:
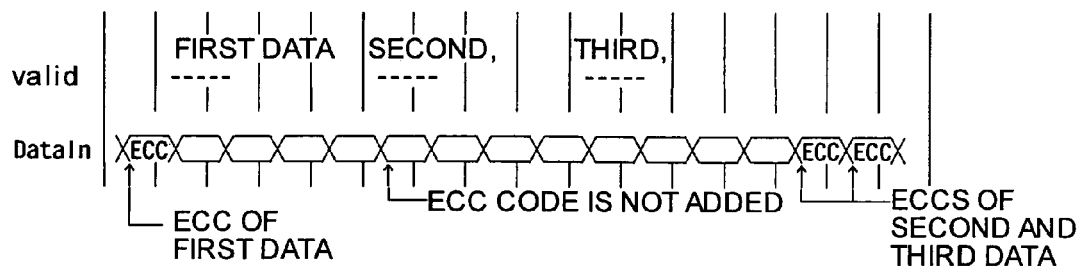
FIG. 14 is a schematic for explaining a method of transmitting the using a blank of a bus.
Figure 15:
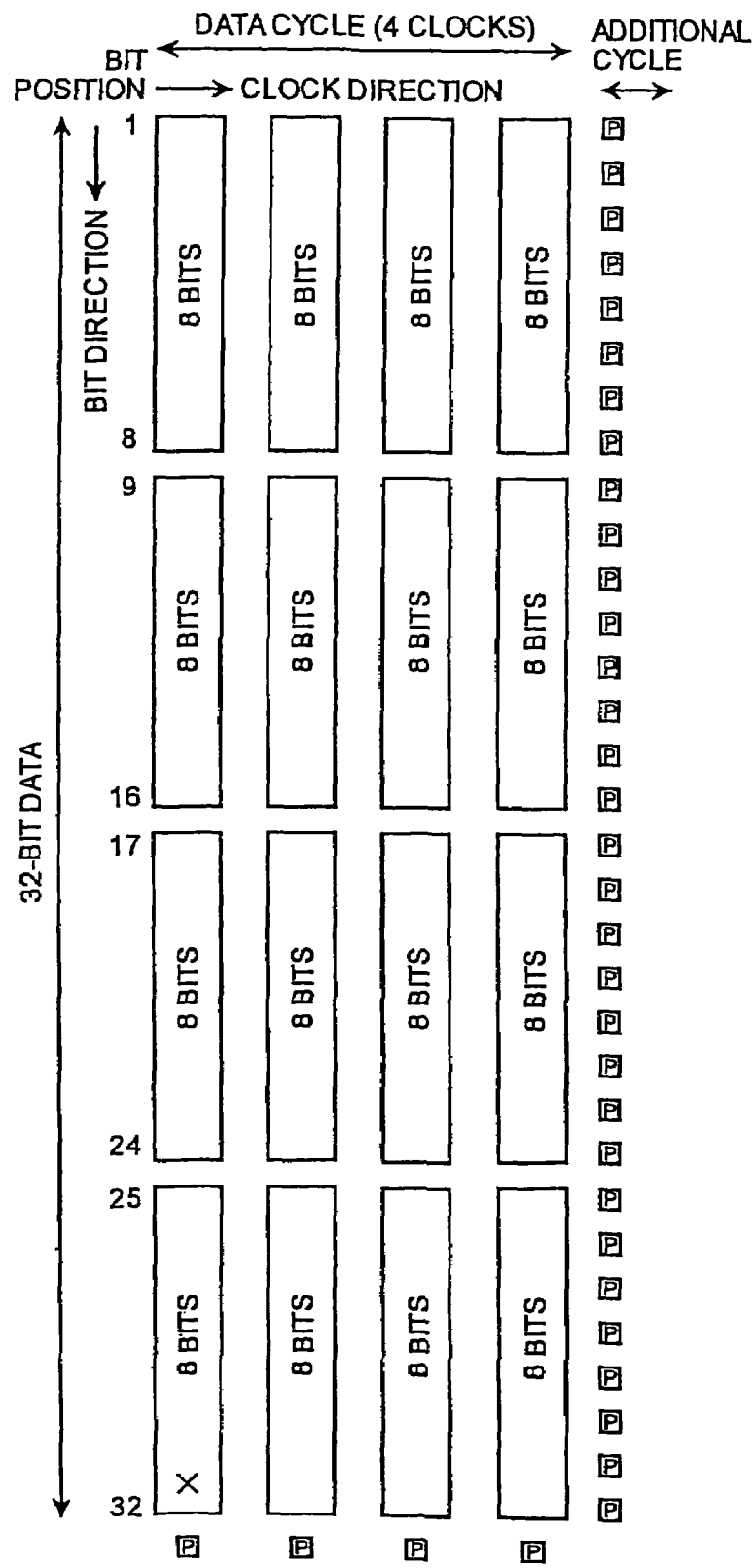
FIG. 15 is a schematic for explaining a conventional error correction method for inter-module data transmission.

FIG. 14 is a schematic for explaining a method of transmitting the using a blank of a bus. FIG. 14 depicts a case in which an ECC for the first data is transmitted before transmission of the first data; and ECCs are not transmitted for the second and subsequent data. In this case, since the bus has a blank after the third data is transmitted, ECCs for the second and third data are transmitted by using the blank. However, in this scheme, the blank of the bus is set within a predetermined period starting from transmission of the data, the ECCs are not transmitted.

In this case, as the predetermined period, a period of average bus busy time starting from transmission of the first ECC is stopped or a period in which transmission of an ECC is stopped a predetermined number of times is set. A period until the next packet is received is set as an ECC transmission period.

More specifically, in the transmission-side module 100 shown in FIG. 2, the data-output control unit 150 holds ECCs for the second and subsequent data. When a blank of the data bus is found in the predetermined period, the held ECCs are output. In the reception-side module 200, the data input control unit 220 holds received data in the predetermined period and receives the ECCs transmitted in the predetermined period.

Association between data and ECCs can be performed by the following manners. That is, ECCs are sequentially associated with data from front data to rear data, the number of transmission routes is increased by several bits to add indexes to data and ECCs, an identification packet is transmitted before ECCs are transmitted, or only an ECC for the most recent data is transmitted.

In this manner, when ECCs are transmitted by using a blank of a bus, the ECCs can be transmitted without adversely affecting data transmission, and the reliability of data transmission can be improved.

The present embodiment describes the case in which data is transmitted between modules. The present invention is not limited to the case. The present invention can also be applied to a case in which data is transmitted by using a plurality of clock cycles in which a plurality of bits is transmitted in parallel between different apparatuses.

According to the present invention, since error correction capability in data transmission is improved, the reliability of data transmission can be advantageously improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data transmitting apparatus that transmits a plurality of bits in parallel in a clock cycle, the data transmitting apparatus comprising:
   a code generating unit that divides original transmission data into a plurality of partial data, and generates an error correction code for each of the partial data;
   a data dividing unit that divides the original transmission data into a plurality of 1-clock data each of which is transmitted in parallel in a clock cycle, wherein the 1-clock data and the partial data are different data; and
   a transmission control unit that sequentially transmits the plurality of 1-clock data one-by-one in synchronization with a clock, and collectively transmits the error correction codes generated by the code generating unit in a clock cycle in synchronization with the clock, wherein each of the error correction codes is made redundant if a sum of lengths of the error correction codes is shorter than a size of the 1-clock data.

2. The data transmitting apparatus according to claim 1, wherein the code generating unit divides the original transmission data based on a bit position at which the original transmission data transmitted in a plurality of clock cycles is transmitted in parallel in each of the clock cycles.

3. The data transmitting apparatus according to claim 1, wherein
   the code generating unit divides the original transmission data into the plurality of partial data by dividing each of the 1-clock data into a plurality of 1-clock partial data and selecting 1-clock partial data having a different bit position when the 1-clock data is transmitted in parallel from each of the 1-clock data, and
   the transmission control unit transmits the error correction code at a bit position different from that of the 1-clock partial data used for generating the error correction code.

4. The data transmitting apparatus according to claim 1, wherein the transmission control unit collectively transmits the error correction codes in a clock cycle after a transmission clock cycle of the 1-clock data.

5. The data transmitting apparatus according to claim 1, wherein the transmission control unit collectively transmits the error correction codes in a clock cycle before a transmission clock cycle of the 1-clock data.

6. The data transmitting apparatus according to claim 1, wherein the transmission control unit includes
   a determining unit that determines whether the error correction codes are transmitted after a transmission clock cycle of the 1-clock data; and
   a code transmission unit that collectively transmits the error correction codes when the determining unit determines to transmit the error correction codes.

7. The data transmitting apparatus according to claim 6, wherein the transmission control unit further includes a path monitoring unit that monitors an idle cycle on a data transmission path, wherein
   when the determining unit determines not to transmit the error correction codes, the code transmission unit collectively transmits the error correction codes when the path monitoring unit detects the idle cycle on the data transmission path within a predetermined period from transmission of the original transmission data.

8. A data transmitting apparatus that transmits a plurality of bits in parallel in a clock cycle, the data transmitting apparatus comprising:
   a code generating unit that divides original transmission data into a plurality of partial data, and generates an error correction code for each of the partial data;
   a data dividing unit that divides the original transmission data into a plurality of 1-clock data each of which is transmitted in parallel in a clock cycle, wherein the 1-clock data and the partial data are different data; and
   a transmission control unit that sequentially transmits the plurality of 1-clock data one by one in synchronization with a clock, and collectively transmits the error correction codes generated by the code generating unit using an idle cycle of a control signal.

9. A data receiving apparatus that receives a plurality of bits transmitted in parallel in a clock cycle from a data transmitting apparatus, as a 1-clock data, the data receiving apparatus comprising:
   a reception control unit that receives transmission data as a plurality of 1-clock data sequentially transmitted by the data transmitting apparatus one-by-one in synchronization with a clock, and collectively receives, in a clock cycle in synchronization with the clock, a plurality of error correction codes generated from a plurality of partial data generated by dividing the transmission data, wherein the 1-clock data and the partial data are different data and each of the error correction codes is made redundant if a sum of lengths of the error correction codes is shorter than a size of the 1-clock data;
   a data building unit that builds data from the plurality of 1-clock data received by the reception control unit; and
   an error correcting unit that corrects the data built by the data building unit using the error correction codes received by the reception control unit to obtain reception data.

10. The data receiving apparatus according to claim 9, wherein the partial data are generated based on a bit position at which the transmission data, transmitted in a plurality of clock cycles, is transmitted in parallel in each of the clock cycles.

11. The data receiving apparatus according to claim 9, wherein the partial data is the 1-clock data.

12. The data receiving apparatus according to claim 9, wherein the partial data is generated by dividing each of the 1-clock data into a plurality of 1-clock partial data and selecting the 1-clock partial data having a different bit position when the 1-clock partial data is transmitted in parallel from each of the 1-clock data.

13. The data receiving apparatus according to claim 9, wherein the reception control unit collectively receives the error correction codes in a clock cycle after a reception clock cycle of the 1-clock data.

14. The data receiving apparatus according to claim 9, wherein the reception control unit collectively receives the error correction codes in a clock cycle before a reception clock cycle of the 1-clock data.

15. The data receiving apparatus according to claim 9, wherein the reception control unit includes
 a determining unit that determines whether the error correction codes are received after a reception clock cycle of the 1-clock data; and
 a code reception unit that collectively receives the error correction codes when the determining unit determines to receive the error correction codes.

16. The data receiving apparatus according to claim 15, wherein the reception control unit further includes a path monitoring unit that monitors an idle cycle on a data transmission path, and
 wherein when the determining unit determines not to receive the error correction codes, the code reception unit collectively receives the error correction codes when the path monitoring unit detects the idle cycle on the data transmission path within a predetermined period from reception of the transmission data.

17. A data receiving apparatus that receives a plurality of bits transmitted in parallel in a clock cycle from a data transmitting apparatus, as 1-clock data, the data receiving apparatus comprising:
 a reception control unit that receives transmission data as a plurality of 1-clock data sequentially transmitted by the data transmitting apparatus one-by-one in synchronization with a clock, and collectively receives, in a clock cycle in synchronization with the clock, a plurality of error correction codes generated from a plurality of partial data generated by dividing the transmission data using an idle cycle of a control signal, wherein the 1-clock data and the partial data are different data;
 a data building unit that builds data from the plurality of 1-clock data received by the reception control unit; and
 an error correcting unit that corrects the data built by the data building unit using the error correction codes received by the reception control unit to obtain reception data.

18. A method of transmitting a plurality of bits in parallel in a clock cycle, the method comprising:
 dividing original transmission data into a plurality of partial data;
 generating an error correction code for each of the partial data;
 dividing the original transmission data into a plurality of 1-clock data each of which is transmitted in parallel, wherein the 1-clock data and the partial data are different data;
 transmitting sequentially the plurality of 1-clock data one-by-one in synchronization with a clock; and
 transmitting the error correction codes generated by the code generating unit in a clock cycle collectively in synchronization with the clock, wherein each of the error correction codes is made redundant if a sum of lengths of the error correction codes is shorter than a size of the 1-clock data.

19. A method of receiving a plurality of bits transmitted in parallel in a clock cycle from a data transmitting apparatus, as a 1-clock data, the method comprising:
 receiving a transmission data as a plurality of 1-clock data sequentially transmitted by the data transmitting apparatus one-by-one in synchronization with a clock;
 receiving, in a clock cycle in synchronization with the clock, a plurality of error correction codes generated from a plurality of partial data generated by dividing the transmission data collectively, wherein the 1-clock data and the partial data are different data and each of the error correction codes is made redundant if a sum of lengths of the error correction codes is shorter than a size of the 1-clock data;
 building data from the plurality of 1-clock data received; and
 correcting the data built at the building using the error correction codes received to obtain a reception data.

* * * * *